Patented Jan. 31, 1933

1,896,039

UNITED STATES PATENT OFFICE

HENRY GAULT AND BERNARD MARIUS ROBERT ANGLA, OF LYON, FRANCE, ASSIGNORS TO SOCIETE DES USINES CHIMIQUES RHONE-POULENC, OF PARIS, FRANCE

PROCESS FOR THE MANUFACTURE OF CELLULOSE BUTYRIC ESTERS

No Drawing. Application filed November 12, 1929, Serial No. 406,716, and in Great Britain November 20, 1928.

Serious difficulties are met with when attempting the manufacture of cellulose butyric esters by the action of butyric anhydride upon cellulose in presence of catalysts, owing to the fact that the catalysts usually employed in the manufacture of cellulose acetate give results which are technically unsatisfactory. Sulphuric acid, for example, when large quantities are used, enables cellulose butyrates to be obtained (Stein, Zeitschr. f. Ang. Chemie, 26, 673), but the products so prepared are not suitable for the manufacture of plastic materials.

When a small quantity only of sulphuric acid is used, it is necessary to have recourse to special artifices in order to obtain a complete butyration (British Letters Patent No. 161,564). The use of the other usual catalysts proposed up to now for the preparation of this ester involves similar drawbacks.

The present invention relates to processes for the manufacture of cellulose butyric esters, which denomination includes both butyric and isobutyric esters as well as their mixtures, and it has for its object an improved process of manufacture of these esters.

According to the present invention, the cellulose or its near conversion products: hydrocellulose, oxycellulose, etc. are treated with butyric anhydride in presence of sulphonic acids derived from aliphatic hydrocarbons, particularly methane-sulphonic acid, and preferably in presence of a diluent which is a solvent of the ester to be obtained. This process has numerous advantages; it is simple, it allows to rapidly obtain a complete butyration, the cellulose butyrates which it yields are homogeneous, and give films which are flexible and strong, and the catalysts can be easily recovered.

Other catalysts adapted to the acetylation of cellulose may be combined with the sulphonic acids derived from aliphatic hydrocarbons, the quantity of sulphonic acid brought into reaction can by this means be reduced while obtaining cellulose butyrates of excellent quality giving clear solutions in organic solvents.

When carrying out the process, the cellulose can be introduced into the mixture of butyric anhydride and catalyst or catalysts, but it is also advantageous to add a diluting agent which is a solvent of the cellulose butyrate to be obtained, for example butyric acid or benzene. Better results are obtained by subjecting the cellulosic fibre to a preliminary treatment intended to facilitate butyration. For example, the cellulosic material may be treated with butyric acid with or without a catalyst; a particularly advantageous preliminary treatment consists in impregnating the fibre, before butyration and preferably when hot, with a quantity of butyric acid of weight less than that of the fibre.

The butyration advantageously takes place in presence of a solvent of the cellulose butyrate to be obtained, for example, in presence of butyric acid or benzene, but good results are also obtained by using an esterifying bath containing solely butyric anhydride and the catalyst.

The manner of carrying out the process, according to the invention, is illustrated by the examples given hereafter, which examples do not in any way limit the invention.

*Example 1.*—100 parts of cotton are stored at ordinary temperature for 16 hours with 500 parts of butyric acid and 30 parts of methane sulphonic acid. 500 parts of butyric anhydride are then added to the mixture and the whole is stirred for 30 hours more at a temperature of 45° C. In this manner, a viscous solution is obtained which is free from fibres and from which the cellulose butyric ester can be extracted by precipitation with water. The butyric acid is recovered by fractional distillation of the water of precipitation, and, by completing the distillation under a good vacuum, the methane sulphonic acid employed is recovered almost integrally. The cellulose ester so obtained has the composition of cellulose tributyrate; it is soluble at the room temperature in acetone, ethyl acetate, chloroform, benzene, toluene, acetic acid, dichlorhydrin, carbon tetrachloride mixed with alcohol; it is insoluble in water, ether, ethyl alcohol, methylalcohol, ligroin. The solutions give, by evaporation, films which are colourless, transparent and strong.

*Example 2.*—100 parts of cotton or pure cellulose as obtained from wood pulp by known processes are stirred for 1 hour with 30 parts of butyric acid, then allowed to stand for 16 hours at a temperature of 90° C. The mixture is then introduced into a mixture of 485 parts of butyric anhydride, 600 parts of butyric acid and 120 parts of methane sulphonic acid, and the whole is stirred either at ordinary temperature for 6 to 8 hours, or for 5 hours at ordinary temperature and for 1 hour at 45° C. A viscous solution free from fibres is obtained from which the cellulose butyric ester is extracted by precipitation with water. The product so obtained has the same solubility as that of Example 1. Its solutions give by evaporation films which are flexible and strong.

In this example, a cellulose butyrate of good quality is also obtained by using only 30 parts of methane sulphonic acid and effecting the butyration by stirring the mass for 24 hours at ordinary temperature, then for 3 hours at 60° C.

*Example 3.*—100 parts of cotton treated with butyric acid as described in Example 2 are poured in a bath containing 500 parts of butyric anhydride, 120 parts of methane sulphonic acid and 500 parts of benzene. After stirring for 5 or 6 hours at ordinary temperature, a viscous solution free from fibres is obtained, which gives by precipitation with alcohol, or with any other suitable liquid, cellulose tri-butyric ester.

*Example 4.*—100 parts of cotton are brought in contact with 900 parts of butyric acid and 20 parts of methane sulphonic acid, and allowed to stand for 16 hours at ordinary temperature. 800 parts of the liquid in excess are then eliminated by pressure, and the pressed mass is placed in an esterifying bath containing 900 parts of butyric anhydride and 50 parts of methane sulphonic acid. After stirring for 20 hours at ordinary temperature, a viscous clear and homogeneous solution is obtained, from which the cellulose butyrate is extracted by precipitation with any suitable liquid.

*Example 5.*—100 parts of cotton, preliminarily treated with butyric acid as described in Example 2, are stirred for 2 hours with 700 parts of butyric anhydride and 150 parts of butyric acid. 150 parts of butyric anhydride and 150 parts of ethane sulphonic acid are then added to the mass at ordinary temperature. After stirring for 2 hours at ordinary temperature, the temperature is raised to 50° C. and, after stirring at this temperature for 4 to 5 hours, a homogeneous viscous solution, free from fibres is obtained from which the cellulose butyric ester is extracted by precipitation with water or with alcohol.

*Example 6.*—100 parts of cotton are stirred for two hours at ordinary temperature with 50 parts of butyric acid and the mixture is then maintained for ten hours at 90° C. To the cooled mixture 500 parts of butyric acid are added and the whole is stirred for two hours at ordinary temperature. A mixture of 50 parts of methane sulphonic acid, 5 parts sulphuric acid and 600 parts butyric anhydride is then poured into the reacting mass; the whole is stirred for 3½ hours at 20–25° C. then for half an hour at 45° C. In this manner, a viscous solution of the cellulose tributyrate in the esterification bath is obtained, this solution is homogeneous and free from fibres. The cellulosic ester is extracted by precipitation, washing and drying.

*Example 7.*—100 parts of cotton are stirred for 2 hours at ordinary temperature with 25 parts of butyric acid; the mixture is maintained for 10 hours at 95° C., and then cooled down to ordinary temperature. A mixture of 800 parts of butyric anhydride, 50 parts methane sulphonic acid and 9 parts sulphuric acid is added. After 1½ hours stirring at 25° C. a viscous solution free from fibres is obtained.

In this example, the butyric anhydride containing the methane sulphonic acid may be added first, the mixture stirred for ¾ hour at 25° C. and the sulphuric acid, diluted with butyric acid poured in afterwards.

*Example 8.*—100 parts of cotton are treated first with 50 parts and then with 500 parts of butyric acid as indicated in Example 6. A mixture of 600 parts butyric anhyride, 30 parts methane sulphonic acid and 50 parts zinc chloride are then poured in. A viscous solution free from fibers is obtained by stirring for 2 hours at 25° C. and 2 hours at 50° C.

*Example 9.*—100 parts of cotton are treated as described in Example 6, first with 50 parts, then with 500 parts butyric acid. A mixture of 600 parts butyric anhydride, 30 parts methane sulphonic acid and 100 parts monochloracetic acid is poured in. After 7 hours stirring at 50° C. a viscous, homogeneous solution, free from fibres is obtained from which the cellulose tributyrate is extracted by precipitation, washing and drying. The cellulosic ester so prepared is soluble in acetone, chloroform, and benzene, and it forms with the solvents clear solutions.

The butyrates of cellulose obtained by means of the present process may be used for the manufacture of plastic materials and particularly of films, of varnishes, of masses similar to celluloid and of artificial silk, according to the methods usually employed for the utilization of cellulose acetates.

What we claim and desire to secure by Letters Patent is:—

1. A process of manufacture of cellulose butyric esters which comprises preliminarily impregnating the cellulose with a quantity of butyric acid the weight of which is less than that of the cellulose and subsequently treating with butyric anhydride in presence of a lower paraffin alkyl sulphonic acid.

2. A process of manufacture of cellulose butyric esters, which comprises preliminarily impregnating the cellulose, heating with a quantity of butyric acid the weight of which is less than that of the cellulose and subsequently treating with butyric anhydride in presence of a lower paraffin alkyl sulphonic acid.

3. A process of manufacture of cellulose butyric esters, which comprises stirring cotton with a quantity of butyric acid the weight of which is less than that of the cellulose, without heating, subsequently adding butyric anhydride and methane sulphonic acid, stirring the mass and extracting the cellulose butyric ester by precipitation.

In testimony whereof we have signed our names to this specification.

HENRY GAULT.
BERNARD MARIUS ROBERT ANGLA.